T. MIDGLEY.
TIRE.
APPLICATION FILED DEC. 16, 1905.

913,220.

Patented Feb. 23, 1909.
6 SHEETS—SHEET 1.

Witnesses
Raphael Netter
A. Richard Wöbse

Thomas Midgley Inventor
By his Attorney Ernest Hopkinson

T. MIDGLEY.
TIRE.
APPLICATION FILED DEC. 16, 1905.

913,220.

Patented Feb. 23, 1909.
5 SHEETS—SHEET 3.

T. MIDGLEY.
TIRE.
APPLICATION FILED DEC. 16, 1905.

913,220.

Patented Feb. 23, 1909.
5 SHEETS—SHEET 4.

Witnesses
Raphael Netter
H. Richard Wobse

Thomas Midgley Inventor
By his Attorney Ernest Hopkinson

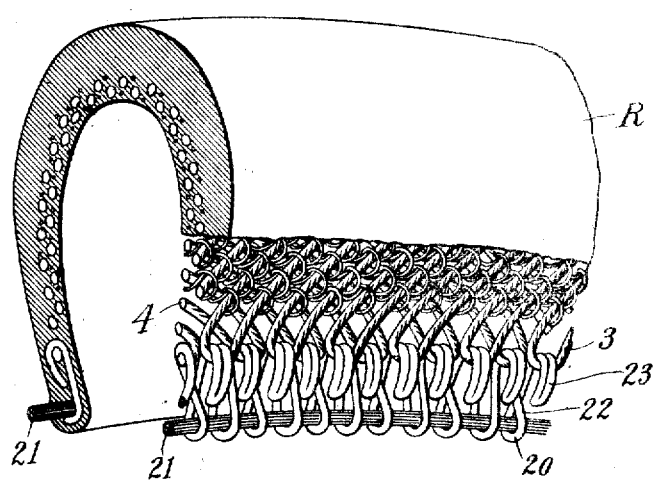
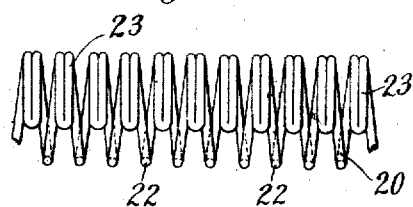

UNITED STATES PATENT OFFICE.

THOMAS MIDGLEY, OF HARTFORD, CONNECTICUT, ASSIGNOR TO THE HARTFORD RUBBER WORKS COMPANY, A CORPORATION OF CONNECTICUT.

TIRE.

No. 913,220.  Specification of Letters Patent.  Patented Feb. 23, 1909.

Application filed December 16, 1905. Serial No. 292,024.

*To all whom it may concern:*

Be it known that I, THOMAS MIDGLEY, a citizen of the United States, residing in Hartford, in the county of Hartford and State of Connecticut, have invented a new and useful Improvement in Tires, of which the following is a specification.

This invention relates to pneumatic tires and particularly to the construction of the body or skeleton to which rubber is applied to form the outer sheath or casing of the so-called "double tube" tires, or the entire tire of the single tube type.

The invention has for its object the production of a tire body characterized by great durability which can be produced at comparatively low cost, and which may readily be embedded in rubber to form a complete tire or tire sheath.

The present invention is analogous in some respects to that disclosed in U. S. Letters Patent No. 762,740 granted to me June 14, 1904, and is an improvement upon the tire disclosed in that patent.

In the following specification I have disclosed several embodiments of my invention, reference being had to the accompanying drawings which form a part of the specification, and the novel features of the invention are clearly pointed out in the appended claims, it being understood that modifications and changes in the structures described and shown may be made within the scope of the claims without departing from the spirit of the invention.

Figure 1:
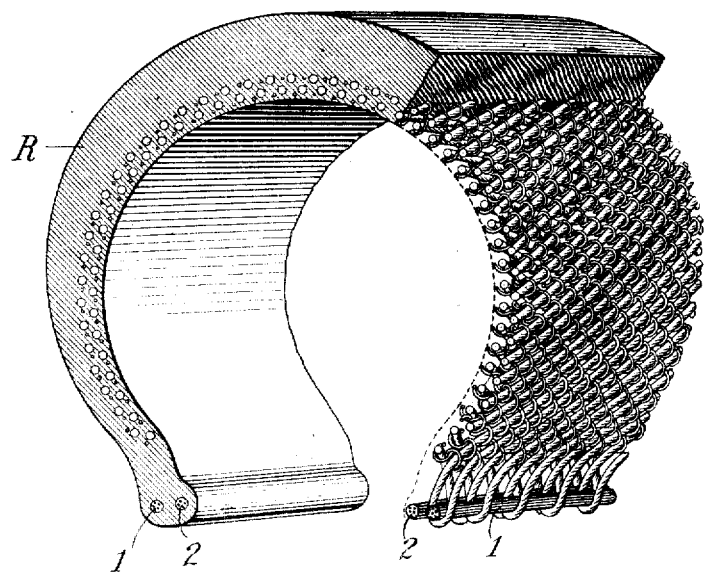
Figure 2:
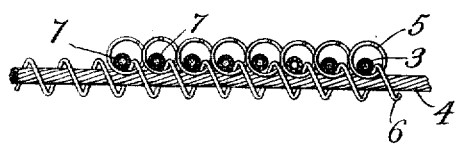
Figure 3:
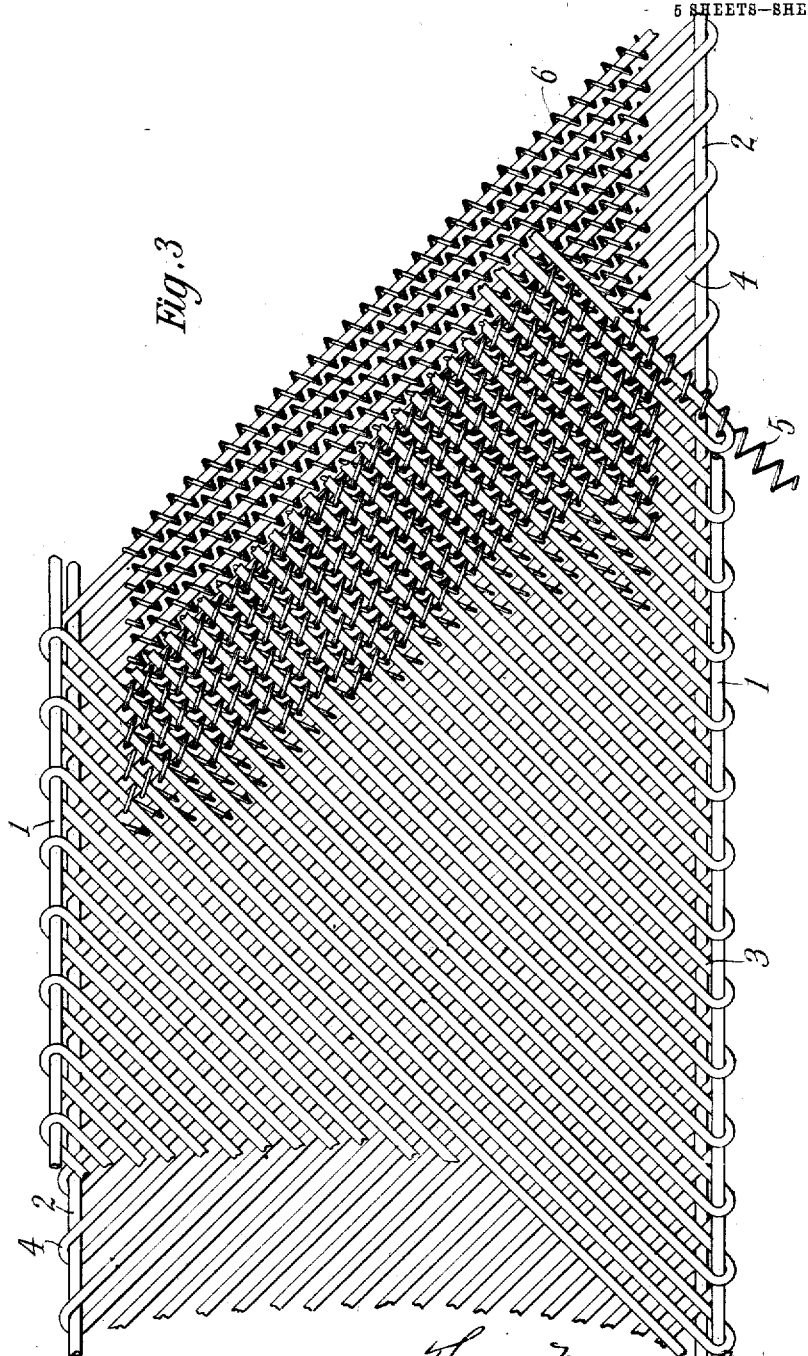
Figure 4:
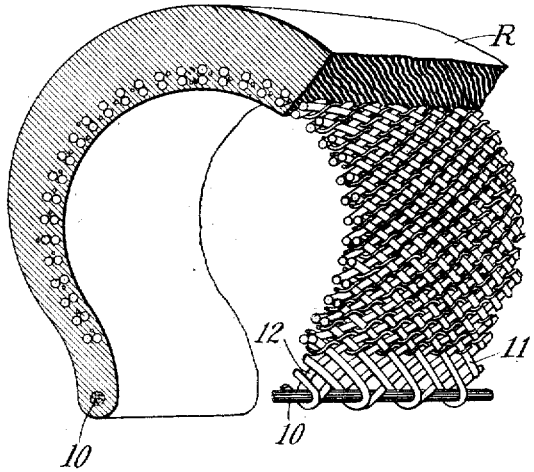
Figure 5:
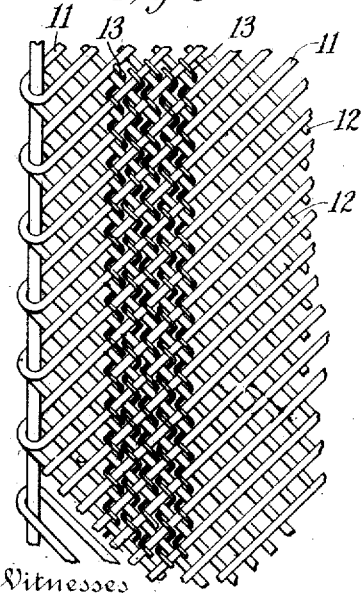
Figure 6:
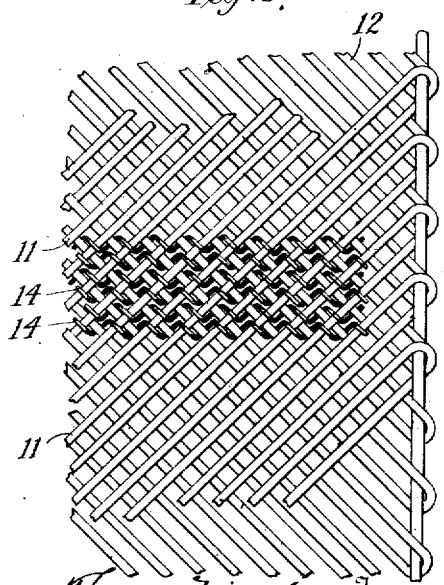
Figure 7:
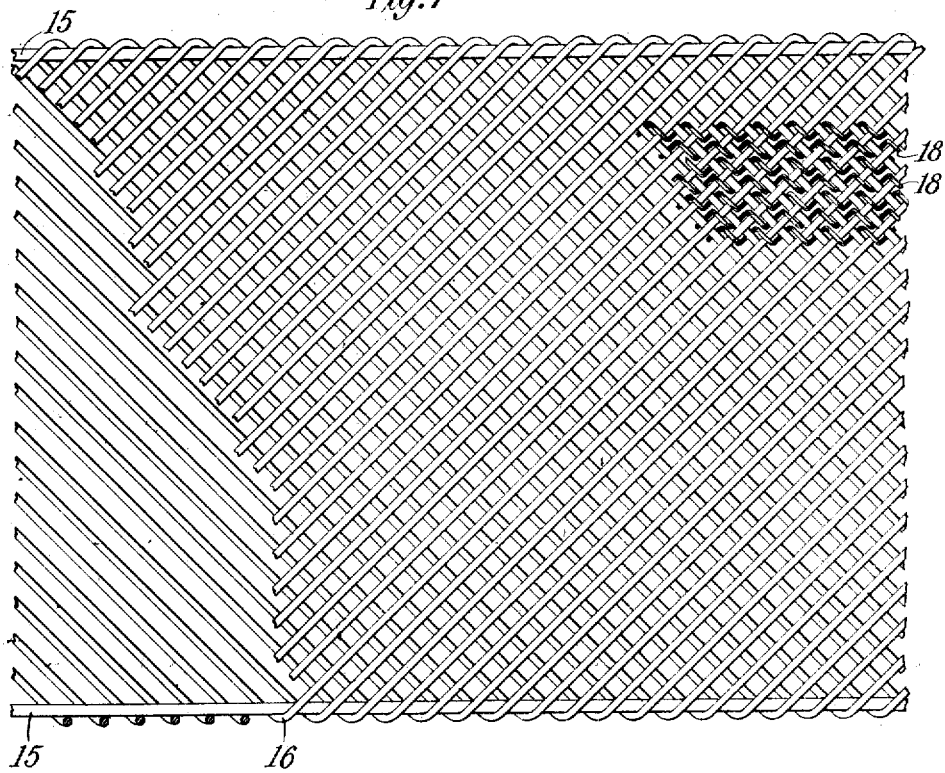
Figure 8:
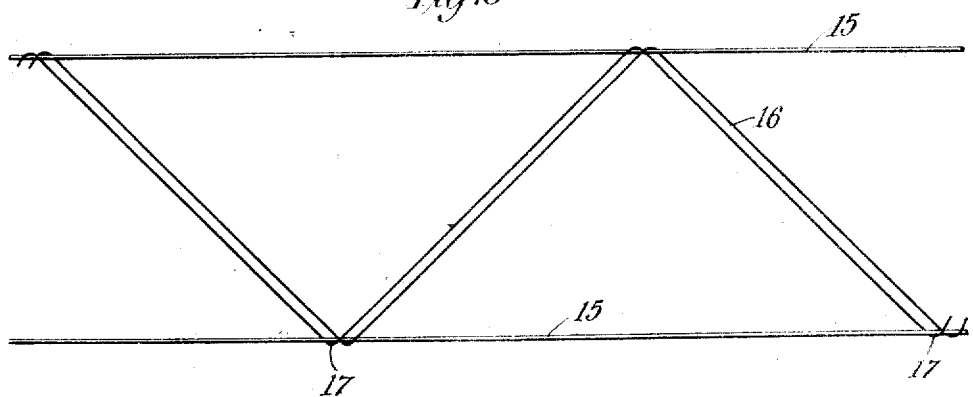

In the drawings: Figure 1 is a fragmentary perspective view of a portion of the outer sheath of a "Dunlop tire" constructed according to the present invention, the rubber being removed from a portion of the tire body or skeleton to show the arrangement of the elements thereof. Fig. 2 is a fragmentary sectional view on an enlarged scale through a portion of a tire body of the character illustrated in Fig. 1, the section being taken in a plane parallel to the strands in one ply of the tire body. Fig. 3 is a detail view in plan showing the arrangement of the strands of cable and the helices of wire in a tire body of the character illustrated in Fig. 1, the tire body being shown as flattened out and with the outer ply above the inner ply. Fig. 4 is a fragmentary perspective view of a section of Dunlop tire similar to Fig. 1, but having a tire body of slightly different construction. Fig. 5 is a detail view showing the mode of constructing the tire body shown in Fig. 4. Fig. 6 is a detail view showing the mode of constructing a tire body like that illustrated in Fig. 4, except that wire helices extend transversely of the tire body instead of longitudinally thereof. Fig. 7 is a view showing the mode of construction of a tire body similar to that shown in Figs. 4 and 5, in some respects, but with the strands of cable differently arranged. Fig. 8 is a diagram showing the mode of laying the strands of cable in the tire body illustrated in Fig. 7. Fig. 9 is a fragmentary view in perspective showing a tire body of the construction illustrated in Fig. 1 in connection with a single side wire at each margin of the tire body, and a connecting device between each side wire and the tire body proper. Fig. 10 is a detail view of the device for connecting the tire body with the side wires, as shown in Fig. 9.

Described in general terms, a tire body constructed in accord with the present invention, consists of two or more series of strands of wire cable or other flexible wire, preferably arranged in separate plies in each of which the strands lie parallel to each other but extend obliquely across the tire from side to side, and a plurality of helices of wire, which are interlaced with the strands of cable or other flexible wire, and serve to hold these strands of cable or other flexible wire in proper relative position. The requisite tensile strength is imparted to the tire body by the strands of cable, which must contain only very fine wire in order to possess the requisite flexibility, and the wire helices which are interlaced or intertwined with the strands of cable not only serve to hold the strands of cable in proper position, but afford a very open reticular structure upon which the rubber of the tire will take an exceedingly firm hold.

Referring to the drawings by means of the reference characters, which designate corresponding parts in the several views, and more particularly to Figs. 1, 2, and 3, 1—1 are two side wires of the type ordinarily used in the construction of the tire sheaths or casings of Dunlop tires, each of these said casings being composed of a plurality of strands as shown, and being made endless and of fixed diameter. The characters 2—2 designate another pair of side wires arranged parallel to the wires 1—1, but between them, as shown. The side wires 1—1 afford an anchorage for a ply or layer of cable strands 3, which are carried to and fro between the side wires 1—1, as best seen in Fig. 3, each strand being carried obliquely across the space between the side wires, around the side wires at one side, and then back along a line parallel to itself. The side wires 1—1 are held somewhat farther apart than the side wires 2—2 during the process of arranging the cable strands thereon, and, consequently, the ply formed of the side wires 1 and the cable strands 3 is wider than that formed on the side wires 2, upon which cable strands 4 are arranged in a manner similar to the arrangement of the strands 3 on the wires 1—1, but at right angles thereto. When the two plies of cable strands are overlaid, as shown in Fig. 3, the strands in the plies cross at right angles as in ordinary square mesh fabric, but without any other interlacing of the strands in the two plies. To hold the cable strands in proper relation without interfering too much with the flexibility of the structure and at the same time to afford an anchorage for the rubber which must be applied to the tire body to complete the tire sheath, two series of wire helices, 5 and 6, are threaded upon the cable strands of the two plies of the tire body. The helices 5, which are applied to the cable strands 3, have their axes parallel to the strands 3, upon which they are threaded, while the axes of the helices 6 are parallel to the strands 4, upon which they are threaded. The helices 5 are not interlaced one with another, but are interlaced with the helices 6, thus forming therewith a unitary but highly flexible structure which is highly reticular in character and holds the cable strands 3 and 4, both plies, so that they cannot be shifted out of their relative positions. As the ply formed of the cable strands 3 on the side wires 1 is wider than that formed on the side wires 2, the side wires 1 will lie in substantially the same horizontal plane with the side wires 2 when the tire body is formed over a core to take the shape of the tire sheath, as shown in Fig. 1. As the strands in each ply are simply carried to and fro on parallel lines, a single cable of sufficient length may be used to form an entire ply, and only one splice will be necessary to make the cable endless, thus obviating the necessity of a joint extending entirely across the ply. As the splice of a single cable in a ply will not materially affect the flexibility of the ply at the point of the splice, the entire tire body will be of uniform flexibility throughout, and the fact that the helices of wire associated with each ply of cable strands are not interlaced with each other, makes the entire structure as flexible as is necessary in a tire body for heavy vehicles.

The flexibility required in the tire body must not be obtained at the expense of durability, and I have found that the best results are obtained by using cables of large diameter in comparison to the diameter of the wires used in forming them, the best construction of cable for the purpose being shown in Fig. 2, in which 7 designates a core of hemp, jute, cotton, or similar fiber, about which a plurality of small cables are twined, each of these small cables being formed of a number of very fine wires laid around a small core of fiber, such as hemp, or the like. The soft cores provided in the cable serve to protect the fine wires from wear against each other, and lend to the entire cable a degree of durability not found in other cables of similar flexibility. The relatively large diameter of the cables 3 and 4 serves a further useful purpose in reducing the tendency of the cables to cut through the rubber R, which is applied to the tire body to complete the tire sheath.

Referring now to Figs. 4 and 5, 10—10 are a pair of side wires of the usual type for Dunlop tire casings, and 11 and 12 designate the cables arranged on the side wires to form an outer and inner ply respectively of the tire body. The cables 11 and 12 are carried by the same side wires, but are arranged at right angles to each other, the strands in each ply being entirely separate from the strands in the other ply, and lying parallel to each other but at right angles to the strands in the other ply. The arrangement of the cables 11 and 12 upon the same side wires makes the strands of one ply serve in a measure to anchor the strands of the other ply in proper relative position, but the helices 13 of wire are employed to insure the proper relative position of the cable strands at all times. These helices are disposed circumferentially of the tire body, as shown in Figs. 4 and 5, and are so interlaced with the cable strands that a single series of helices, which are not interlaced with one another, binds together the cable strands of both plies.

In Fig. 6 the cable strands 11 and 12 are arranged as shown in Figs. 4 and 5, but the longitudinally disposed helices 13 are replaced by transversely disposed helices 14, which serve the same purpose, but diminish to some extent the flexibility of the tire body in a transverse direction, thus tending to decrease the sharpness of the flexure of the sides of the tire where it is in contact with the road-bed.

In Figs. 1 to 6 inclusive, a tire body has been shown as having two plies of cable strands which were entirely separate and distinct, the cables after passing around the side wires being carried back along lines parallel to themselves.

In Figs. 7 and 8 I have illustrated the construction of a tire body in which strands of both plies of cable are formed of the same cable or cables, each cable after passing around one side wire being carried back to the other side wire along a line not parallel to itself, but at right angles thereto, thus passing entirely around the circumference of the tire body along a zigzag line, as best shown in Fig. 8. When a tire body is constructed in this way, the same cable serves throughout half its length to form strands of one ply, and during the other half to form strands of the other ply, the strands in each ply being disposed at right angles to each other, as in the forms of tire body already described. In the construction of a tire body of the kind shown in Fig. 7, side wires 15 of the ordinary construction are used, and one or more cables 16 may be wound around the side wires in the zigzag direction diagrammatically illustrated in Fig. 8. The number of cables which may be used is limited only by the number of strands which lie between successive turns of the same course of cable about the same side wire, as between the points 17—17 in Fig. 8. If these points are twelve inches apart and a quarter-inch mesh is desired, it is obvious that no more than forty-eight cables can be wound on the side wires to produce the desired construction, and it is also obvious that by carrying the same cable around the same side wires in forty-eight successive courses, the entire structure might be produced and only one splice would be necessary. In connection with the cable strands arranged as shown in Figs. 7 and 8, I employ a plurality of wire helices interlaced with the cable strands to hold them in proper relation, longitudinal helices 18 being illustrated in Fig. 7. It is obvious, however, that these longitudinally disposed helices may be replaced by others arranged transversely, as shown in Fig. 6, or two series of helices may be employed, if desired.

As it is not always convenient to wind the cables on the side wires directly, I have devised an intermediate connecting device 20 of the construction illustrated in Figs. 9 and 10, which is provided on each side wire 21, and the cables of the tire body are secured thereto. The connecting device 20 is formed of wire, and comprises a series of eyes 22 through which the side wires pass, and a corresponding number of hooks 23, upon which loops or turns of the cable are caught. Associated with the connecting device, I have illustrated in Fig. 9 a tire body of the construction shown in Fig. 1, both the outer cable strands 3 and the inner cable strands 4 being secured upon the hooks 23 of the connecting device, but it will be clearly seen that a tire body having the strands arranged therein after any of the plans above described may be constructed upon connecting devices of this character; but I have not deemed it necessary to show the various different types of tire body in combination with such connecting devices.

After the completion of a tire body after any one of the plans above described, the tire body is embedded in rubber in any suitable manner to obtain the proper thickness of rubber at the tread and completely to cover the interior of the tire body so that it may not injure the inner, or air, tube of the tire.

From the foregoing description and the drawings illustrative thereof, it will be seen that all the strain upon the tire is borne by the strands of cable or other flexible wire, which may, therefore, be properly designated "tension members," but the tension members are held in proper relation to each other by means of the interlaced helices of wire, which may therefore be properly designated "stays."

While I have described wire cable of certain construction as the best material of which to form the tension members of the tire body, it is to be understood that braided wire or other wire of suitable flexibility and strength may be used in lieu thereof, and I use the term cable as broadly covering any such flexible wire structure.

While the description and drawings are limited to tire sheaths or casings of the "Dunlop" type, it is to be understood that the same principles of construction may be employed in the manufacture of tire bodies of other types.

Having thus fully described my invention, what I claim is:

1. A tire body composed of obliquely-disposed tension members and interlaced helical stays.

2. A tire body composed of a plurality of obliquely-disposed tension members, the strands in one ply crossing the strands of the adjacent ply substantially at right angles, and interlaced helical stays.

3. A tire body comprising a plurality of obliquely-disposed strands of wire cable, and stays for securing said strands in proper position.

4. A tire body comprising a plurality of plies, each consisting of parallel strands of flexible wire cable arranged transversely of the tire, and means for securing the said strands in proper relative position.

5. A tire body composed of a plurality of plies of obliquely-disposed strands of wire cable, the strands in each ply being substantially parallel to each other and disposed at right angles to the strands in the adjacent plies, and means for fastening the plies together.

6. A tire body comprising oblique tension members of wire cable, and stays consisting of wire helices interlaced with said tension members.

7. A tire having a body composed of tension members of wire cable arranged transversely of the tire, and helical wire stays for said tension members, and a covering of rubber penetrating the interstices of said body.

8. A rubber tire body having embedded therein side wires, a connecting device carried by each side wire and presenting a plurality of hooks, and a metallic tire body having strands thereof secured on said hooks.

9. A rubber tire body having embedded therein side wires, connecting devices carried by said side wires and presenting a plurality of hooks, and a metallic tire body secured on said hooks.

In testimony whereof, I have signed my name in the presence of two witnesses.

THOMAS MIDGLEY.

Witnesses:
 BAXTER MORTON,
 H. RICHARD WOBSE.